March 11, 1969  H. ALBINGER, JR  3,432,699
PERMANENT MAGNETIC SYNCHRONOUS MOTOR AND
STARTING MECHANISM THEREFOR
Filed Jan. 21, 1966
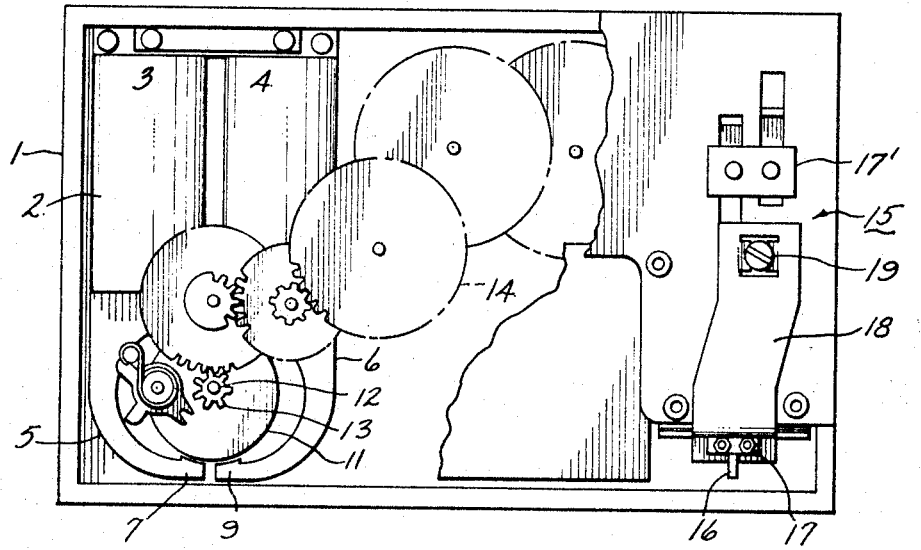
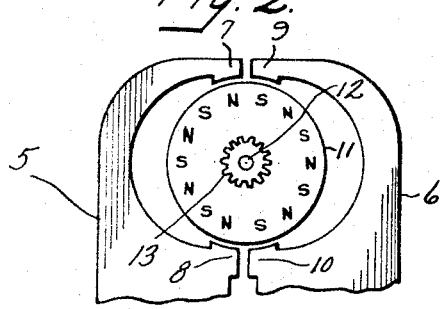
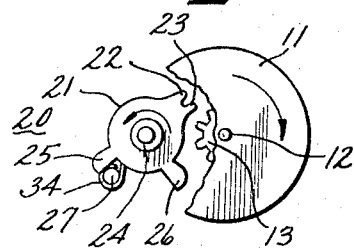
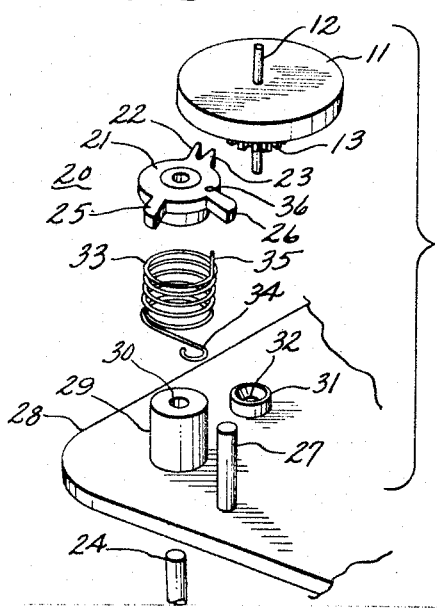
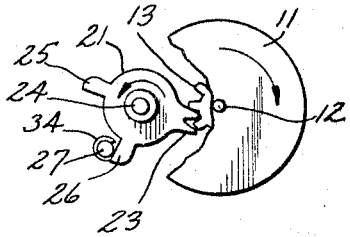
Inventor:
Harry Albinger Jr.
by Leonard J Platt
Attorney

United States Patent Office 3,432,699
Patented Mar. 11, 1969

3,432,699
PERMANENT MAGNETIC SYNCHRONOUS MOTOR AND STARTING MECHANISM THEREFOR
Harry Albinger, Jr., Ashland, Mass., assignor to General Electric Company, a corporation of New York
Filed Jan. 21, 1966, Ser. No. 522,197
U.S. Cl. 310—41
Int. Cl. H02k 7/118
4 Claims

ABSTRACT OF THE DISCLOSURE

A permanent magnet synchronous motor and starting mechanism therefor wherein a starting member is held out of engagement with the motor after the motor has been started.

---

This invention relates to a means for starting a synchronous motor and more particularly to an improved starting arrangement for a nonself-starting synchronous motor.

One application of a nonself-starting synchronous motor is in a timekeeping device such as a battery operated clock. A type of synchronous motor that has been developed for use in battery operated clocks comprises a permanent magnet rotor pulse driven synchronous motor wherein a very low frequency pulse signal is applied to the stator windings of the motor so that the permanent magnet rotor rotates at a speed which is synchronized with the frequency of the pulses. In one type of battery operated clock the origin of the low frequency pulses used to drive the motor at a synchronous speed is an electro-mechanical oscillator system including a very accurate mechanical oscillating member and an associated electronic circuit which is synchronized by the oscillations of the mechanical member. The synchronized electrical oscillations are amplified and delivered to the motor in the form of electrical pulses. An electro-mechanical oscillator system which may be utilized in such a battery operated clock is described and claimed in a copending application to Jones, Ser. No. 522,290, which is assigned to the assignee of the present invention. A very accurate permanent magnet pulse type synchronous motor which may be utilized in a battery operated clock is described and claimed in another copending application to Petrides, Ser. No. 522,129, which is also assigned to the assignee of the present invention.

In order to preserve space and to keep expenses down, the synchronous motor typically utilized in battery operated clocks has no provision for electrical or self-starting. Consequently, some mechanical means to start the rotor rotating at a synchronous speed must be provided. One undesirable way to start a nonself-starting synchronous motor rotating is simply to manually flick the rotor with the operator's fingers. Apart from being very cheap, this method has several drawbacks over and above the obvious drawback of the possibility of flicking the rotor in the wrong direction. One of these drawbacks is that if the flick is not powerful enough so that synchronous speed or a speed above synchronous speed is not reached, the rotor will slow down and eventually stop. If, however, the flick is so powerful that a speed greatly in excess of synchronous speed is reached, two possibilities, both of which are undesirable, may occur. The first is if the attained speed is approximately twice that of synchronous speed, every other pole of the rotor may lock in with the timing pulses, and the rotor will continue to rotate at twice the synchronous speed. The most likely result from overspinning the rotor shaft is that the rotor begins to coast down to a slower speed at such a high rate that when it passes through its synchronous speed the pulses do not have time to bring the rotor into step. The rotor then passes right through synchronous speed and continues to slow down to a stop.

To overcome these problems, manual devices which initiate rotation in the rotor at approximately synchronous speed have been devised. One of these devices employs a spring means which is set to a predetermined tension so that approximately the same amount of energy is converted into rotary motion of the shaft every time the spring means is employed. One problem that arises in the use of springs, however, is that if the frictional losses in the rotor bearings or in the mechanical linkage between the spring means and the rotor shaft are too high, the energy of the spring will be absorbed by these losses rather than in the shaft itself. When this occurs, the relationship between the tension in the spring and the speed at which it is desired to rotate the rotor is lost. Another problem that may rise when a spring means is utilized to start the rotor shaft is that very often the mechanical linkage between the spring and the rotor shaft is in the form of gears which may become jammed should the rotor shaft randomly stop at such an angular position that its gear teeth line up directly with the top of the gear teeth attached to the spring means. This problem is called "topping" and its inexpensive solution has been heretofore unattainable.

It is, therefore, an object of this invention to provide a starting means for a nonself-starting synchronous motor which eliminates the problem of false starting.

It is another object of this invention to provide a starting arrangement for a synchronous motor that eliminates the problem of "topping" or jamming between the gear teeth of the starting arrangement and the rotor.

These and further objects of this invention are achieved in one form through the utilization of a permanent magnet rotor of a relatively high moment of inertia and which includes a plurality of poles around the periphery thereof which, when the electrical signals to the stator windings of the motor are removed, tend to magnetically line up with the stator poles in any one of a number of predetermined angular positions equal to the total number of poles or pole pairs on the rotor. By employing a rotor shaft pinion gear with a total number of gear teeth equal to the number of rotor poles or any integral multiple or integral division thereof, and which are aligned with the rotor poles or pole pairs in a predetermined angular relationship, the gear teeth on the starting mechanism can be positioned so that a non-jamming mesh with the pinion gear occurs in any one of the predetermined number of possible angular positions of the rotor shaft.

The subject matter regarded as my invention is particularly pointed out and distinctly claimed in the appended claims. The invention, however, both as to its mode of operation, together with further objects and advantages thereof may best be understood with reference to the following description taken in connection with the accompanying drawings in which:

FIG. 1 is a cutaway view of the back of a battery operated clock which employs a synchronous motor starting means according to the teachings of the present invention, FIG. 2 shows an enlarged cross section of the synchronous motor permanent magnet rotor and stator, FIG. 3 shows an enlarged view of the starting mechanism for the motor in its de-activated position, FIG. 4 shows the starting mechanism for the synchronous motor in its "cocked" or activated position, and FIG. 5 shows an exploded perspective view of the starting mechanism for the synchronous motor.

Referring now to FIG. 1 the battery operated clock includes a casing 1 and a synchronous motor 2 including a pair of stator coils 3 and 4 respectively wound on a pair of stator pieces 5 and 6. The stator piece 5 includes a visible stator pole 7 and another stator pole 8 not shown in FIG. 1 and the stator piece 6 includes a visible pole 9 and another stator pole 10 also not shown in FIG. 1. A permanent magnet rotor 11 is centrally disposed in the opening formed by the stator pieces 5 and 6 and is mounted upon a rotor shaft 12. An engageable means or rotor pinion gear 13 is mounted on the rotor shaft 12 and is shown in meshing engagement with a gear train 14. The gear train 14 drives a pair of clock hands (not shown) at an accurately timed angular velocity. Electrical timing pulses for the synchronous motor 2 are delivered to the stator windings 3 and 4 by means of an electronic circuit (not shown). The electronic circuit is synchronized to a very accurate frequency by means of a mechanical oscillating member 15 which may include a torsion member 16, one end of which is shown in FIG. 1. The torsion member 16 is mounted at either end by a pair of mounting means 17 and 17' and its mechanical vibrating frequency is adjusted by means of a tension spring member 18. The tension applied to the torsion wire 16 by the spring member 18 is adjusted by means of an adjusting screw 19.

FIG. 2 shows the permanent magnet motor rotor 11 and the stator pieces 5 and 6 in a greatly enlarged view. The stator poles 7 and 8 for the stator piece 5 and the poles 9 and 10 for the stator piece 6 are shown in very close physical proximity to the permanent magnet rotor 11. The permanent magnet rotor 11 is illustrated with alternately disposed magnetic poles around its periphery represented by alternate N's and S's. The total number of poles around the periphery of the rotor 11 is not an essential point with respect to the present invention; but in a preferred embodiment of the battery operated clock produced by the assignee of the present invention, this number was chosen to be fourteen. With respect to the present invention it is only required that the number of poles on the periphery of the rotor 11 be known since this number is to be utilized in a manner as will hereinafter become apparent.

Situated on the rotor shaft 12 is the rotor shaft pinion gear 13 which is adapted to engage a gear train 14 shown in FIG. 1 but not shown in FIG. 2.

FIG. 3 shows a reverse view of the rotor, rotor shaft, and pinion gear of the view shown in FIG. 2 and further shows the starting means for the rotor according to the teachings of the present invention. In FIG. 3 a portion of the permanent magnet rotor 11 is cut away so that a portion of the pinion gear 13 is shown. The starting mechanism for the rotor shaft 12 represented generally by the number 20. The starting mechanism 20 includes a movable means or sector gear 21 including an engageable means such as a pair of gear teeth 22 and 23 and is mounted on a shaft 24. The sector gear 21 further includes a pair of stop surfaces 25 and 26 and the sector gear is positioned with respect to a pin 27 such that the stop surfaces 25 and 26 are angularly disposed on either side thereof. The sector gear 21 is adapted to be rotated about the shaft 24 through an angular path the end limits of which are determined by the angle between the stop surfaces 25 and 26. It will be apparent that the angular travel of the gear sector 21 is impeded at these end limits by the action of the stop surfaces 25 and 26 engaging the pin 27. In FIG. 3 the gear sector 21 is shown in its de-activated position with the gear teeth 22 and 23 in non-meshing contact with the gear teeth of the rotor pinion 13. In this position the stop surface 25 is in engagement with the pin 27.

In FIG. 4 the gear sector 21 is shown rotated clockwise an angular distance equal to the angle between the stop surfaces 25 and 26 so that the stop surface 26 engages the pin 27. In this position the gear sector 21 is "cocked" or activated and the gear teeth 22 and 23 are in engagement with the teeth of the pinion gear 13.

Before describing the operation of the starting mechanism 20 reference is hereby made to FIG. 5 wherein an exploded perspective view of the starting mechanism 20 and the rotor 11 is illustrated. In FIG. 5 the rotor 11 is shown with its shaft 12 extending therethrough. Attached to the bottom surface of the rotor 11 is the rotor pinion gear 13. The gear sector 21 is positioned just below the rotor 11 and includes the two stop surfaces 25 and 26 and the pair of gear teeth 22 and 23. The shaft 24, about which the gear sector rotates, is shown at the bottom of the illustration of FIG. 5. The stop pin 27 is illustrated to be mounted on a base mounting plate 28 which may be appropriately positioned in the clock casing 1. Also mounted on the base plate 28 is a core member 29 which is provided with a hole 30 through which the shaft 24 extends. A spacer washer 31 is also mounted on the base plate 28 and is also provided with a hole 32 through which the rotor shaft 12 extends. The respective heights of the core member 29 and the spacer washer 30 are such that when the gear sector 21 and the rotor 11 are in their operating positions, the gear teeth 22 and 23 of the gear sector are in the same plane as the gear teeth for the pinion gear 13 so that engagement therebetween is made possible.

A coil spring member 33, illustrated in FIG. 5, is adapted to be positioned around the core member 29 and to be fastened at its lower end by means of a hook portion 34 to the pin 27. The upper end of the spring member 33 includes a vertically extending portion 35 which is adapted to be positioned through a hole 36 in the gear sector 21. When the spring member 33 is in the position illustrated in FIG. 5, the gear sector 21 is in its de-activated position as illustrated in FIG. 3.

Referring now to FIG. 4 it should now be apparent that when the gear sector 21 is rotated until the stop member 26 engages the pin 27, the potential energy of the spring means 33 becomes increased over that in the spring when the stop member 25 is in engagement with the pin 27. Thus, when the operator desires to start the synchronous motor 2, he merely releases the gear sector 21 from its position illustrated in FIG. 4 to allow the spring member to rotate the gear sector 21 back to its de-activated position illustrated in FIG. 3. As the gear sector 21 rotates from its position shown in FIG. 4 to that shown in FIG. 3, the gear teeth 22 and 23, which are then engaged with the pinion gear 13, cause the rotor shaft 12 to rotate in the clockwise direction. When the gear sector 21 returns to its position shown in FIG. 3 the gear teeth 22 and 23 are again out of engagement with the pinion gear 13 so that the rotor continues to rotate until the electrical pulses in the stator windings lock the rotor in step at the synchronous speed. The size of the spring member 33, the amount of energy stored in the spring when it is in the activated position, and the time of driving engagement between the gear teeth 22 and 23 and the pinion gear 13 determine the amount of energy, and therefore the speed, that is imparted into the rotor shaft 12 and to the rotor 11. These variables are preferably chosen so that the terminal speed imparted to the rotor 11 is slightly greater than the synchronous speed so that the electrical pulses have sufficient time to lock the rotor in step at the synchronous speed. However, this speed is not made so great that the rotor coasts down so fast that it does not allow the electrical pulses time to lock in.

In some prior art devices which employ spring type starting mechanism for synchronous motors, some of the energy stored in the spring becomes absorbed by the bearings of the rotor shaft and by frictional losses in the moving mechanical parts in the starting means itself. When this happens the speed imparted to the rotor may become inaccurate for proper starting of the motor. In one type of prior art device, a stronger spring than normal was utilized in conjunction with some sort of governor or speed regulating means in order to compensate for the inaccuracies resulting from these energy losses. Applicant has discovered that a much more simpler and less expensive speed regulation means can be obtained simply by making the moment of inertia of the rotor 11 relatively high so that most of the energy stored in the spring becomes absorbed in the rotor in attempting to overcome the rotor's moment of inertia. The particular size and moment of inertia of the rotor which will achieve these results depends entirely upon the particular size of spring utilized and the amount of frictional and other losses incurred. Therefore, the moment of inertia of the rotor 11 is another variable to be taken into consideration along with the particular size of spring utilized and the gear teeth relationship between the starting gear sector 21 and the rotor pinion gear 13 to arrive at a suitable starting mechanism 20. Although there may be several emperical methods which may be employed to determine the particular values of these variables for any particular synchronous motor, applicant has discovered that in preferred applications the cheapest and therefor the best method to obtain these values is simply through trial and error. Since in most applications all of the synchronous motors utilized are fairly standard, once the values have been obtained through trial and error they are set and no further adjustment of them is necessary.

In order to prevent "topping" of the gear teeth of the starting gear sector 21 and the pinion gear 13 during start up, applicant has contrived a means whereby the rotor shaft 12 stops in any one of a predetermined number of angular positions rather than stopping at random angular position. Specifically, after the rotor shaft coasts down to a stop, if the angular position of the rotor shaft 12 and therefore the pinion gear 13, is known, the starting mechanism 20 including the gear sector 21 and its gear teeth 22 and 23 can be positioned relative to this known angular position so that no possibility of "topping" of the gear teeth exists. To this end, reference is again made to FIG. 2 wherein, as described above in a preferred embodiment, fourteen permanent magnet poles of the rotor are represented by alternating N's and S's around the periphery of the rotor 11. Applicant has discovered that when the electric power to the motor becomes cut off, the rotor poles will attempt to line up with the lowest magnetic reluctance path that they can find which will usually be the pole pieces 7, 8, 9, and 10 of the stator pieces 5 and 6. Thus, it is relatively certain that when the rotor 11 slows down to a stop, it will line up with four of its permanent magnet poles directly lined up with the four stator pole pieces. This type of alignment is illustrated in FIG. 2. Since there are only fourteen different angular positions at which the rotor 11, and therefore the rotor shaft 12, can stop, by prepositioning the pinion gear 13 on the rotor shaft 12, the pinion gear teeth will always line up in one of fourteen known relationships with respect to the fourteen angular positions possible for the rotor 11. The most easy relationship that can be used is to align each tooth directly with one of the poles on the rotor 11. This type of alignment is also illustrated in FIG. 2.

It is necessary that the pinion gear 13 include a total number of gear teeth equal to the number of permanent magnet poles on the rotor, or at least an integer number multiple or an integer number division thereof. This is necessary in order to insure that the gear sector 21 can be positioned so that its gear teeth 22 and 23 come into non-topping contact with the pinion gear teeth in all of the fourteen possible angular positions of the pinion gear.

In another arrangement the electric power to the stator coils 3 and 4 may be applied at the time a battery is inserted into the electronic circuit. In this case the stator pole pieces 7 and 8 may become energized north while the stator pole pieces 9 and 10 will become energized south. Before the rotor 11 is started it will rotate a slight angular amount so that two of its north poles line up with the south poles 9 and 10 of the stator and so that two of its south poles line up with the north stator poles 7 and 8. Thus, in this arrangement there are only seven possible angular positions of the rotor 11 before start-up or a number equal to the number of rotor pole pairs. Thus, a pinion gear 13 may be employed which includes a total number of gear teeth equal to an integer number division of the number of poles on the rotor 11.

Although this invention has been described in a particular embodiment, the principles underlying the invention will suggest many modifications of this embodiment to those skilled in the art. Therefore, it is desired that the appended claims not be limited to the described embodiment but rather should cover all such modifications as fall within the spirit and scope of this invention.

What I claim as new and desire to secure by Letters Patent of the United States is:

1. A permanent magnet synchronous motor and starting mechanism therefor comprising:
    (a) a rotor,
    (b) a rotor shaft to which said rotor is fixedly secured,
    (c) first engaging means fixedly secured to said rotor shaft,
    (d) movable means including second engaging means engageable with said first engaging means, said movable means and second engaging means not engaging said first engaging means when said movable means is in a first position and engaging said first engaging means when said movable means is in a second position,
    (e) a spring means attached to said movable means and having a lower amount of potential energy stored therein when said movable means is in its first position than when said movable means is in its second position,
    (f) said spring means adapted to move said movable means from its second position to its first position and, by means of said first and second engaging means, to transform potential energy stored in said spring means into kinetic energy in said rotor and said rotor shaft,
    (g) said rotor having a large moment of inertia relative to all other previously recited elements such that substantially all the potential energy stored in said spring means becomes transformed into kinetic energy of said rotor and said rotor shaft,
    (h) said spring means having a tension when said movable means is in its second position such that kinetic energy imparted to said rotor and said rotor shaft at the time said movable means moves from its second position to its first position is sufficient to rotate said rotor and said rotor shaft at a speed approximately equal to the synchronous speed of the motor.

2. A permanent magnet synchronous motor and starting mechanism therefor comprising,
    (a) a rotor including a plurality of permanent magnet poles,
    (b) a rotor shaft to which said rotor is fixedly secured,
    (c) a stator including a plurality of stator poles in close proximity to said rotor such that when the synchronous motor is not running, a number of said plurality of permanent magnet poles equal to the number of said plurality of stator poles will line up in a minimum reluctance path with each one of said plurality of stator poles,
    (d) first engaging means fixedly secured to said rotor shaft including a plurality of gear teeth, the plurality being equal in number to, or an integral multiple or division of, a number equal to the plurality of said permanent magnet poles,
    (e) said first engaging means being pre-positioned on said rotor shaft so that a determinable relationship exists between the angular position of each of said plurality of permanent magnet poles and a respective angular position of at least one of said plurality of gear teeth on said first engaging means, (f) starting means including at least one gear tooth engageable with said plurality of gear teeth on said first engaging means and movable to impart rotary motion to said rotor shaft and said rotor, (g) said starting means being pre-positioned so that when moved into engagement with said first engaging means, a proper mesh results between said plurality of gear teeth on said first engaging means and said gear teeth of said starting means.

3. The permanent magnet synchronous motor and starting mechanism therefor as defined in claim 2 wherein the number of said plurality of gear teeth on said first engaging means is equal to the number of said plurality of permanent magnet poles, and wherein the relationship between the angular position of said plurality of permanent magnet poles and the respective angular position of said plurality of gear teeth of said first engaging means is zero angular degrees.

4. A permanent magnet synchronous motor and starting mechanism therefor comprising, (a) a rotor including a plurality of permanent magnet poles, (b) a rotor shaft to which said rotor is fixedly secured, (c) a stator including a plurality of stator poles in close proximity to said rotor such that when the synchronous motor is not running, a number of said plurality of permanent magnet poles equal to the number of said plurality of stator poles will line up in a minimum reluctance path with each one of said plurality of stator poles, (d) first engaging means fixedly secured to said rotor shaft including a plurality of gear teeth, the plurality being equal in number to, or an integral multiple or division of, a number equal to the plurality of said permanent magnet poles, (e) said first engaging means being pre-positioned on said rotor shaft so that a determinable relationship exists between the angular position of each of said plurality of permanent magnet poles and a respective angular position of at least one of said plurality of gear teeth on said first engaging means, (f) a movable starting means including at least one gear tooth engagable with said plurality of gear teeth on said first engaging means, said starting means not engaging said first engaging means when said starting means is in a first position and engaging said first engaging means when in a second position, (g) a spring means attached to said starting means and having a lower amount of potential energy stored therein when said starting means is in its first position than when said starting means is in its second position, (h) said spring means adapted to move said starting means from its second position to its first position and, by means of the gear teeth on said starting means and said first engaging means, to transform potential energy stored in said spring means into kinetic energy in said rotor and said rotor shaft, (i) said rotor having a large moment of inertia relative to all other previously recited elements such that substantially all the potential energy stored in said spring means become transformed into kinetic energy of said rotor and said rotor shaft, (j) said spring means having a tension when said movable means is in its second position such that the kinetic energy imparted to said rotor and said rotor shaft at the time said movable means moves from its second position to its first position is sufficient to rotate said rotor and said rotor shaft at a speed approximately equal to the synchronous speed of the motor, (k) said starting means being pre-positioned so that when moved into engagement with said first engaging means, a proper mesh results between said plurality of gear teeth on said first engaging means and said gear teeth of said starting means.

References Cited

UNITED STATES PATENTS

| | | | |
|---|---|---|---|
| 2,027,944 | 1/1936 | Whitehead et al. | 318—136 X |
| 2,722,297 | 11/1955 | Gates | 192—4 |
| 3,179,216 | 4/1965 | Tetro | 192—4 |
| 3,225,874 | 12/1965 | Woolley | 192—4 |
| 3,256,453 | 6/1966 | Haydon | 310—156 |
| 3,308,315 | 3/1967 | Mahon et al. | 310—41 |

WARREN E. RAY, *Primary Examiner.*

U.S. Cl. X.R.

310—156, 162; 192—4